(12) United States Patent
Cheng

(10) Patent No.: US 7,724,055 B2
(45) Date of Patent: May 25, 2010

(54) CLOCK RECEIVERS

(75) Inventor: Wen-Chang Cheng, Taoyuan County (TW)

(73) Assignee: Nanya Technology Corporation, Taoyuan (TW)

( * ) Notice: Subject to any disclaimer, the term of this patent is extended or adjusted under 35 U.S.C. 154(b) by 206 days.

(21) Appl. No.: 11/970,987

(22) Filed: Jan. 8, 2008

(65) Prior Publication Data

US 2008/0272819 A1    Nov. 6, 2008

(30) Foreign Application Priority Data

May 1, 2007    (TW) .............................. 96115463 A

(51) Int. Cl.
*H03K 3/017*    (2006.01)
(52) U.S. Cl. ...................................... 327/175; 327/172
(58) Field of Classification Search ................ 327/298, 327/165, 166, 172, 175, 176
See application file for complete search history.

(56) References Cited

U.S. PATENT DOCUMENTS

| | | | | |
|---|---|---|---|---|
| 5,572,158 A | * | 11/1996 | Lee et al. ..................... | 327/175 |
| 6,670,838 B1 | * | 12/2003 | Cao .......................... | 327/175 |
| 6,967,514 B2 | * | 11/2005 | Kizer et al. ................. | 327/175 |
| 7,184,323 B2 | * | 2/2007 | Fujisawa ............... | 365/189.05 |
| 7,265,597 B2 | * | 9/2007 | Khawshe .................... | 327/175 |
| 7,496,155 B1 | * | 2/2009 | Lu et al. ..................... | 375/326 |

* cited by examiner

*Primary Examiner*—Hai L Nguyen
(74) *Attorney, Agent, or Firm*—Quintero Law Office

(57) ABSTRACT

A clock receiver is provided. A receiving unit receives a pair of complementary clocks and generates a first clock, and a calibration unit detects whether a cross point of the complementary clocks has shifted, generates a detected result and accordingly adjusts toggling of the first clock.

8 Claims, 7 Drawing Sheets

140
CLOCK RECEIVERS

BACKGROUND OF THE INVENTION

1. Field of the Invention

The invention relates to semiconductor circuits, and in particular to a clock receiver automatically capable of calibrating phase offset caused by inconsistency in duty cycles between the complementary clocks.

2. Description of the Related Art

Generally, dynamic random access memories (DRAMs) use a clock receiving unit to receive a pair of complementary clocks (such as VCLK and /VCLK) and accordingly generates a main clock (such as MCLK) for internal circuits. However, the duty cycles of the complementary clocks are inconsistent because of element mismatch, temperature or other factors.

As shown in FIG. 1A, the duty cycle of the clock VCLK is larger than that of the clock /VCLK, such that cross points CP3 and CP4 of the two clocks VCLK and /VCLK are generated at times t1 and t3, respectively rather than at predetermined times t2 and t4, respectively. Namely, the cross time of the two clocks is advanced because of inconsistency of the duty cycles thereof. On the contrary, the cross time of the two clocks is delayed as shown in FIG. 1B, when the duty cycle of the clock VCLK is smaller than that of the clock /VCLK. Namely, the clock receiving unit in the DRAMs receive a distorted clock MCLK0 rather than the predetermined main clock MCLK0. Thus, the clocks MCLK0 and MCLK1 have a phase offset affecting margin of the clocks in the internal circuits in the DRAMs.

BRIEF SUMMARY OF THE INVENTION

Embodiments of a clock receiver are provided, in which a receiving unit receives a pair of complementary clocks and generates a first clock and a calibration unit detecting whether a cross point of the complementary clocks has shifted, generates a detected result and adjusts toggling of the first clock accordingly.

The invention provides another embodiment of a semiconductor memory module, in which a clock receiver receives a pair of complementary clocks and generates a main clock, and the clock receiver comprises a receiving unit receiving the complementary clocks and generating a first clock and a calibration unit detecting whether a cross point of the complementary clocks has shifted, generates a detected result and adjusts toggling of the first clock accordingly thereby outputting a main clock. A core logic unit outputs corresponding control clocks and data according to the main clock.

The invention provides an embodiment of a calibration method, in which a first clock is generated according to a pair of complementary clocks, whether a cross point of the complementary clocks has shifted is detected to generate a detected result, a set of bias voltages is generated according to the detected result, and toggling of the first clock is adjusted according to the bias voltages.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
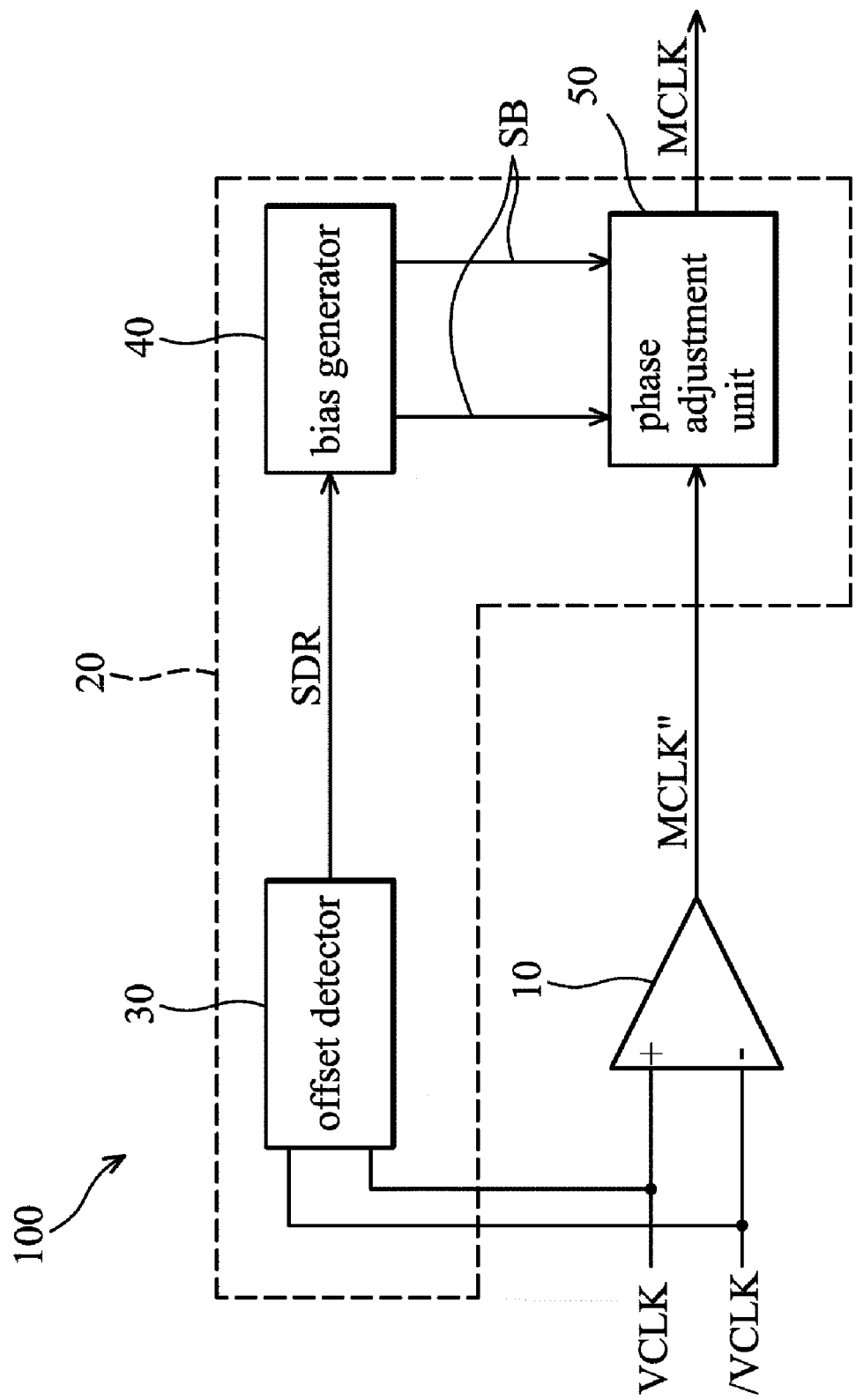
FIG. 2 shows an embodiment of a clock receiver according to the invention.

FIG. 2 shows an embodiment of a clock receiver according to the invention. As shown, the clock receiver 100 comprises a receiving unit 10 receiving a pair of complementary clocks VCLK and /VCLK and accordingly generating a clock MCLK". A calibration unit 20 detects whether a cross point of the complementary clocks VCLK and /VCLK has shifted and accordingly adjusts toggling of the clock MCLK" thereby outputting a main clock MCLK. The calibration unit 20 comprises an offset detector 30, a bias generator 40 and a phase adjustment unit 50. For example, the clock receiver 100 can be disposed in a semiconductor chip, but is not limited thereto.

The receiving unit 10 receives the clocks VCLK and /VCLK to generate the clock MCLK". For example, the receiving unit 10 can be a receiver. The receiver pulls high the clock MCLK" when the level of the clock VCLK exceeds that of the clock /VCLK, and pulls low the clock MCLK" when the level of the clock VCLK is lower than that of the clock /VCLK. In addition, the receiving unit 10 can also be an inverse receiver. Namely, the receiver pulls low the clock MCLK" When the level of the clock VCLK exceeds that of the clock /VCLK and pulls high the clock MCLK" when the level of the clock VCLK is lower than that of the clock /VCLK.

The offset detector 30 detects whether there is offset between the duty cycles of the complementary clocks VCLK and /VCLK and generates a detection result SDR. The bias generator 40 generates a set of bias voltages SB according the detection result SDR. The phase adjustment unit 50 adjusts the toggling of the clock MCLK" according to the set of bias voltages SB, thereby outputting the main clock MCLK.

For example, when the offset detector 30 detects that the cross points are advanced because of offset between the duty cycles of the clocks VCLK and /VCLK, the phase adjustment unit 50 delays the toggling of the clock MCLK" according to the bias voltage SB from the bias generator 40, thereby eliminating the distortion caused by advanced cross points. On the contrary, when the offset detector 30 detects that the cross points are delayed because of offset between the duty cycles of the clocks VCLK and /VCLK, the phase adjustment unit 50 advances the toggling of the clock MCLK" according to the bias voltage SB from the bias generator 40, thereby eliminating the distortion caused by delayed cross points.

Figure 3:
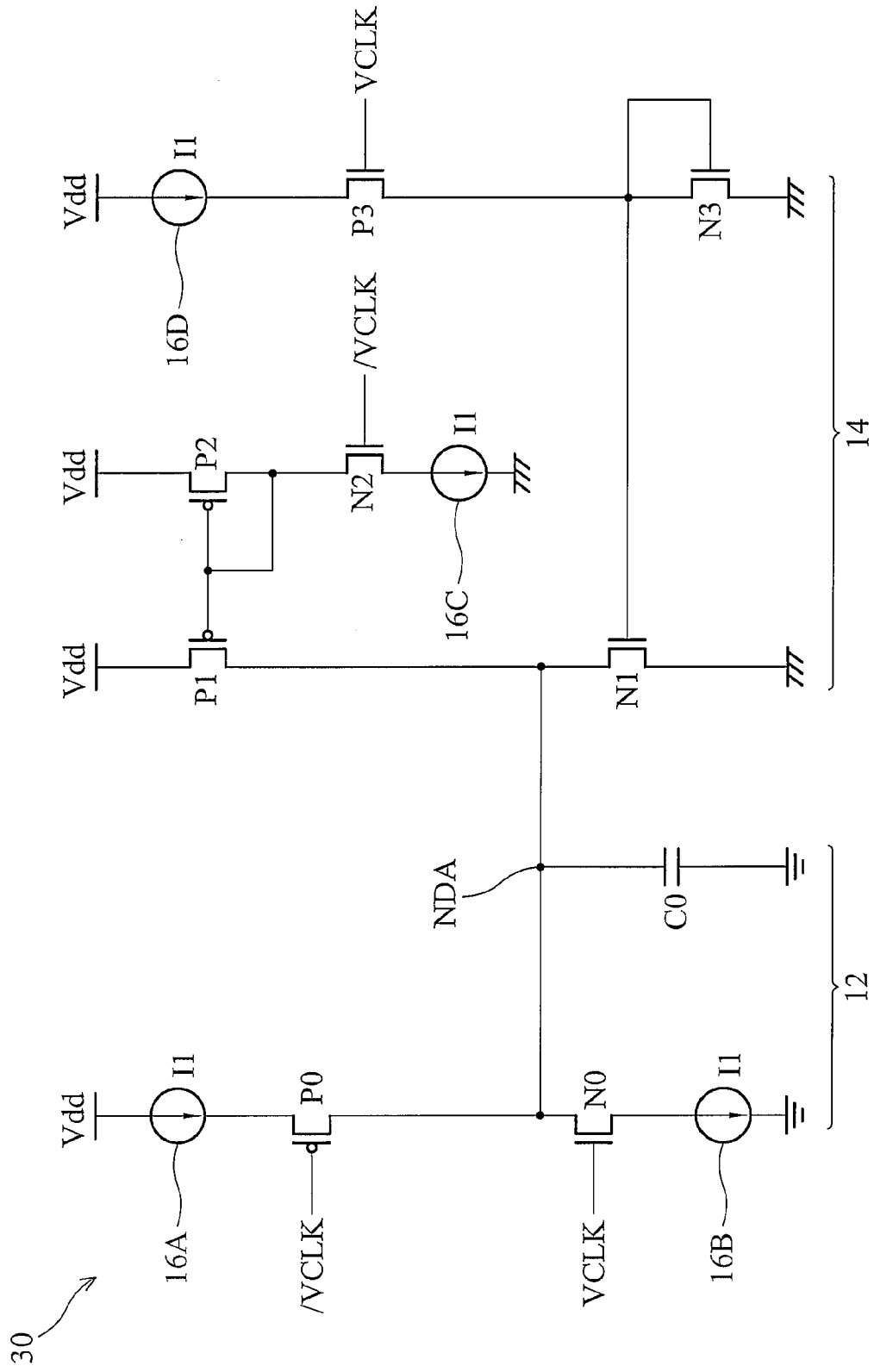
FIG. 3 shows an embodiment of an offset detector according to the invention.

FIG. 3 shows an embodiment of an offset detector according to the invention. As shown, the offset detector 30 comprises two detection units 12 and 14, in which the detection unit 12 comprises two current sources 16A and 16B, transistors P0 and N0 and a capacitor C0. The current source 16A is coupled between a power voltage Vdd and the transistor P0, the current source 16B is coupled between a ground voltage GND and the transistor N0, and the capacitor C0 is coupled between the node NDA and the ground voltage GND. The transistor P0 is coupled between the current source 16A and the node NDA, the transistor N0 is coupled between the current source 16B and the node NDA, and control terminals of the transistors P0 and N0 are coupled to the clocks /VCLK and VCLK respectively. In this embodiment, the voltage on the node NDA is served as the detection result SDR.

The detection unit 14 comprises two current sources 16C and 16D and transistors P1~P3 and N1~N3. The transistor P1 is coupled between the power voltage Vdd and the node NDA, the transistor N1 is coupled between the node NDA and the ground voltage GND. The transistor P2 comprises a first terminal coupled to the power voltage Vdd, a second terminal coupled to the transistor N2 and a control terminal coupled to the control terminal of the transistor P1. The transistor N2 comprises a first terminal coupled to the current source 16C, a control terminal coupled to the clock /VCLK and a second terminal coupled to the control terminals of the transistors P1 and P2, and the current source 16C is coupled between the transistor N2 and the ground voltage GND. The current source 16D is coupled between the ground voltage GND and the transistor P3, the transistor P3 comprises a first terminal coupled to the current source 16D, a second terminal coupled to the transistor N3 and a control terminal coupled to the clock VCLK. The transistor N3 comprises a first terminal coupled to the ground voltage GND, a second terminal coupled to the second terminal of the transistor P3 and the control terminal of the transistor N1, and a control terminal coupled to the second terminal thereof.

When the clocks VCLK and /VCLK are high and low respectively, the detection unit 12 is enabled to detect whether the cross points of the clocks VCLK and /VCLK is advanced or delayed because of offset between the duty cycles of the clocks VCLK and /VCLK, and the detection unit 14 is disabled because the transistors N2 and P2 are turned off.

At this time, if the duty cycle of the clock /VCLK is smaller than that of the clock VCLK, turn-on time of the transistor N0 is longer than that of the transistor P1 and the capacitor C0 is discharged such that the voltage on the node NDA is decreased. Thus, the detection unit 12 detects that the cross time of the clocks VCLK and /VCLK has advanced because of offset between the duty cycles of the clocks VCLK and /VCLK.

On the contrary, if the duty cycle of the clock /VCLK is larger than that of the clock VCLK, turn-on time of the transistor P0 is longer than that of the transistor N1 and the capacitor C0 is charged such that the voltage on the node NDA is increased. Thus, the detection unit 12 detects that the cross time of the clocks VCLK and /VCLK has delayed because of offset between the duty cycles of the clocks VCLK and /VCLK.

When the clocks VCLK and /VCLK are low and high respectively, the detection unit 14 is enabled to detect whether the cross points of the clocks VCLK and /VCLK has advanced or delayed because of offset between the duty cycles of the clocks VCLK and /VCLK, and the detection unit 12 is disabled because the transistors N0 and P0 are turned off.

At this time, if the duty cycle of the clock /VCLK is smaller than that of the clock VCLK, turn-on time of the transistor P3 is longer than that of the transistor N2 such that the voltage on the node NDA is decreased. Thus, the detection unit 14 detects that the cross time of the clocks VCLK and /VCLK has advanced because of offset between the duty cycles of the clocks VCLK and /VCLK.

On the contrary, if the duty cycle of the clock /VCLK is larger than that of the clock VCLK, turn-on time of the transistor N2 is longer than that of the transistor P3 such that the voltage on the node NDA is increased. Thus, the detection unit 14 detects that the cross time of the clocks VCLK and /VCLK has delayed because of offset between the duty cycles of the clocks VCLK and /VCLK.

Namely, the offset detector 30 detects that the cross points of the clocks VCLK and /VCLK have advanced or delayed because of offset between duty cycles of the clocks VCLK and /VCLK according to the voltage on the node NDA.

Figure 4:
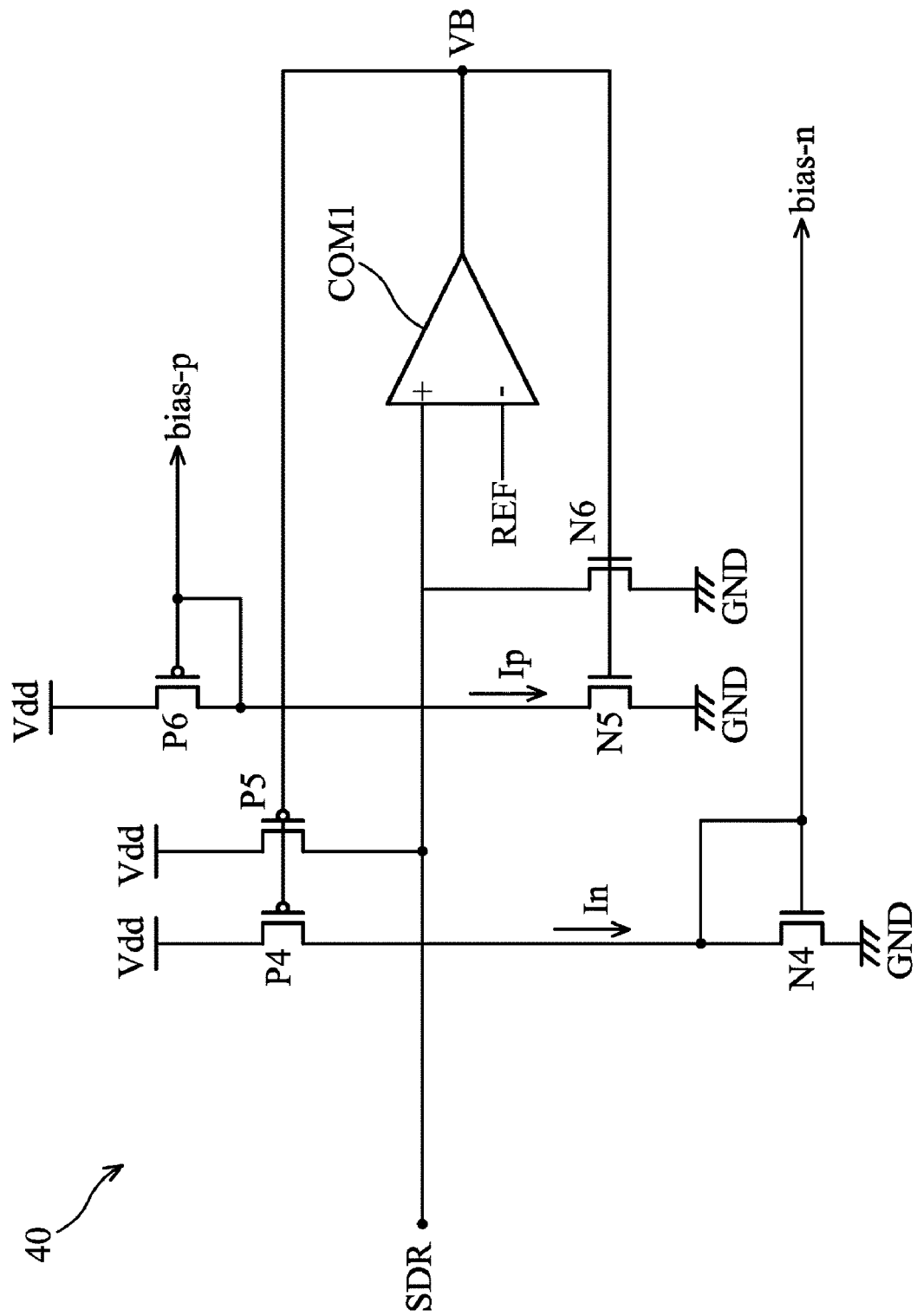
FIG. 4 shows an embodiment of a bias generator according to the invention.

FIG. 4 shows an embodiment of a bias generator according to the invention. As shown, the bias generator 40 comprises a comparator COM1 and transistors P4~P6 and N4~N6. The comparator COM1 comprises a first input internal coupled to the node NDA, a second input internal coupled to a reference voltage REF and an output internal coupled to control terminals of the transistors P4~P6 and N4~N6. The transistor P4 is coupled between the power voltage Vdd and the transistor N4, and the transistor P5 is coupled between the power voltage Vdd and the node NDA. The transistor P6 is coupled between the power voltage Vdd and the transistor N5, and drain and gate thereof are connected together to output a bias voltage bias-p.

The transistor N4 is coupled between the ground voltage GND and the transistor P4, and the drain and gate thereof are connected together to output a bias voltage bias-n. The transistor N5 is coupled between the ground voltage GND and the transistor N6 is coupled between the ground voltage GND and the node NDA.

For example, when the detection result SDR (i.e., the voltage on the node NDA) is lower than the reference voltage REF, the voltage on the output terminal of the comparator COM1 is decreased, such that the pulling high capability of the transistor P5 is increased and the current In through the transistor P4 is increased, and thus, the voltage (i.e., bias voltage bias-n) on the gate terminal of the transistor N4 is accordingly increased. At the same time, the pulling low capability of the transistor N6 is decreased and the current Ip through the transistor N5 is decreased and thus, the voltage (i.e., bias voltage bias-p) on the gate terminal of the transistor P6 is accordingly increased.

On the contrary, when the detection result SDR (i.e., the voltage on the node NDA) exceeds the reference voltage REF, the voltage VB on the output terminal of the comparator COM1 is increased, such that the pulling high capability of the transistor P5 is decreased and the current In through the transistor P4 is decreased and thus, the voltage (i.e., bias voltage bias-n) on the gate terminal of the transistor N4 is accordingly decreased. At the same time, the pulling low capability of the transistor N6 is increased and the current p through the transistor P6 is increased and thus, the voltage (i.e., bias voltage bias-p) on the gate terminal of the transistor P6 is accordingly decreased.

In summary, the bias voltages bias-p and bias-n are both increased when the voltage on the node NDA is decreased, and are both decreased when the voltage on the node NDA is increased. Namely, the bias generator 40 generates the bias voltages bias-p and bias-n according to the voltage on the node NDA in the offset detector 30. In the embodiment, the bias voltages bias-p and bias-n serve as the bias voltage SB shown in FIG. 2.

Figure 5:
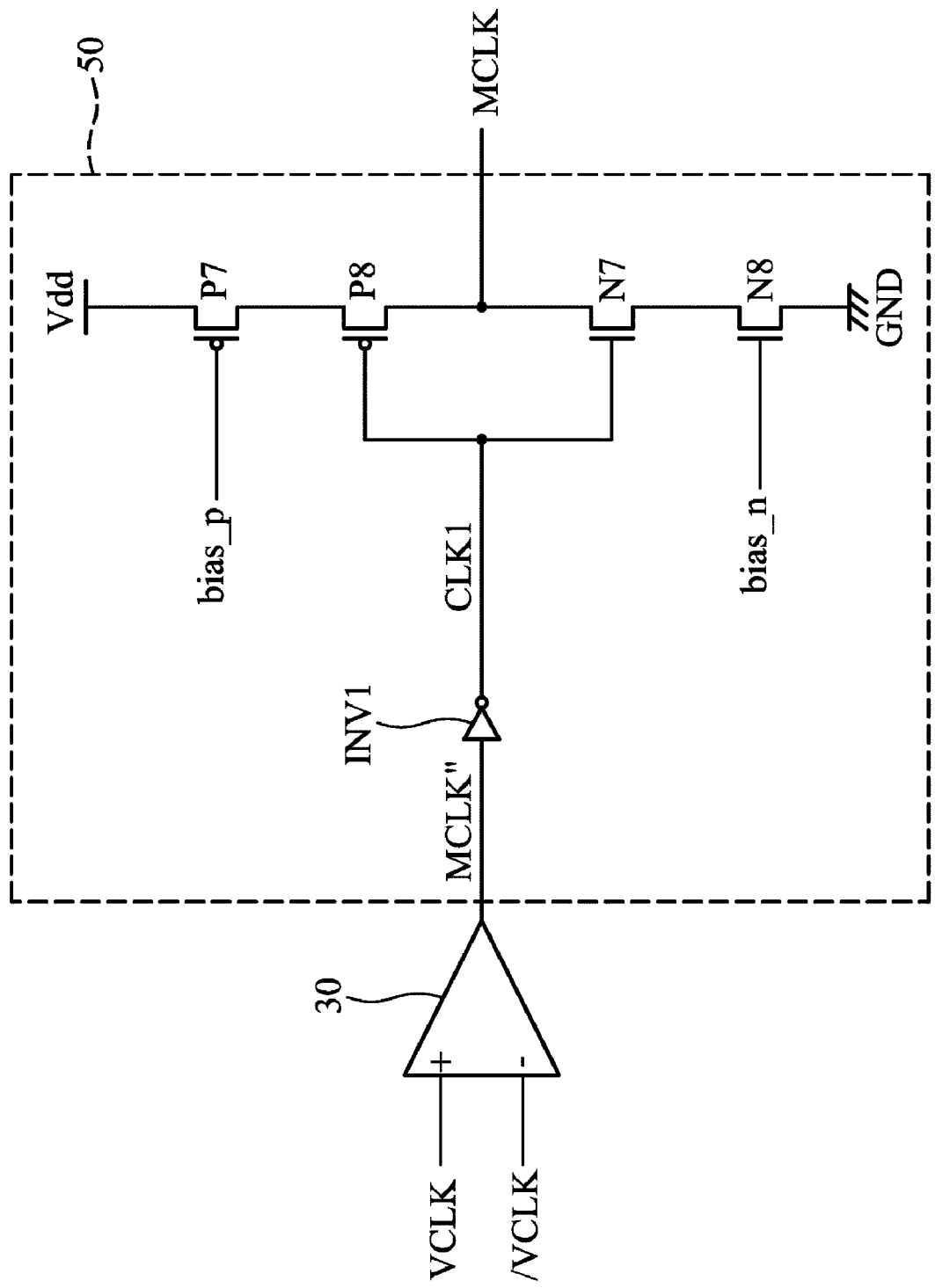
FIG. 5 shows an embodiment of a phase adjustment unit according to the invention.

For example, when the duty cycle of the clock /VCLK is smaller than that of the clock VCLK, the voltage on the node NDA in the offset detector 30 is decreased and the bias voltages bias-p and bias-n are both increased. When the duty cycle of the clock /VCLK is larger than that of the clock VCLK, the voltage on the node NDA in the offset detector 30 is increased and the bias voltages bias-p and bias-n are both decreased FIG. 5 shows an embodiment of a phase adjustment unit according to the invention. As shown, the phase adjustment unit 50 comprises an inverter INV1 and transistors P7~P8 and N7~N8. The inverter INV1 comprises an input terminal coupled to the output terminal of the receiving unit 10 and an output terminal coupled to control terminals of the transistors P8 and N7. The transistor P7 is coupled between the power voltage Vdd and the transistor P8, and comprises a control terminal coupled to the bias voltage bias-p. The transistors P8 and N7 serve as an inverter, and a first terminal of the inverter (i.e., transistors P8 and N7) outputs the main clock MCLK and a second terminal of the inverter (i.e., transistors P8 and N7) is coupled to the transistors P7 and N8. The transistor N8 is coupled between the ground voltage GND and the transistor N7, and comprises a control terminal coupled to the bias voltage bias-n.

For example, when the level of the clock VCLK exceeds that of the clock /VCLK, the clock MCLK" goes high and the clock CLK1 accordingly goes low and thus, the main clock MCLK goes high. On the contrary, when the level of the clock VCLK is smaller than that of the clock /VCLK, the clock MCLK" goes low and the clock CLK1 accordingly goes high and thus, the main clock MCLK goes low.

In the embodiment, according to the bias voltages bias-n and bias-p, the phase adjustment unit 50 advances or delays the toggling generated when the clocks VCLK and /VCLK cross thereby outputting the main clock MCLK with an accurate phase.

For example, when the bias voltages bias-p and bias-n are both increased, the pulling high capability of the transistor P7 is increased and the pulling low capability of the transistor N8 is decreased. Thus, the phase adjustment unit 50 can generate a clock with a delayed rising edge or an advanced falling edge. On the contrary, when the bias voltages bias-p and bias-n are both decreased, the pulling high capability of the transistor P7 is decreased and the pulling low capability of the transistor N8 is increased. Thus, the phase adjustment unit 50 can generate a clock with a delayed falling edge or an advanced rising edge.

Case 1: Delaying the Rising Edge

Figure 1A:
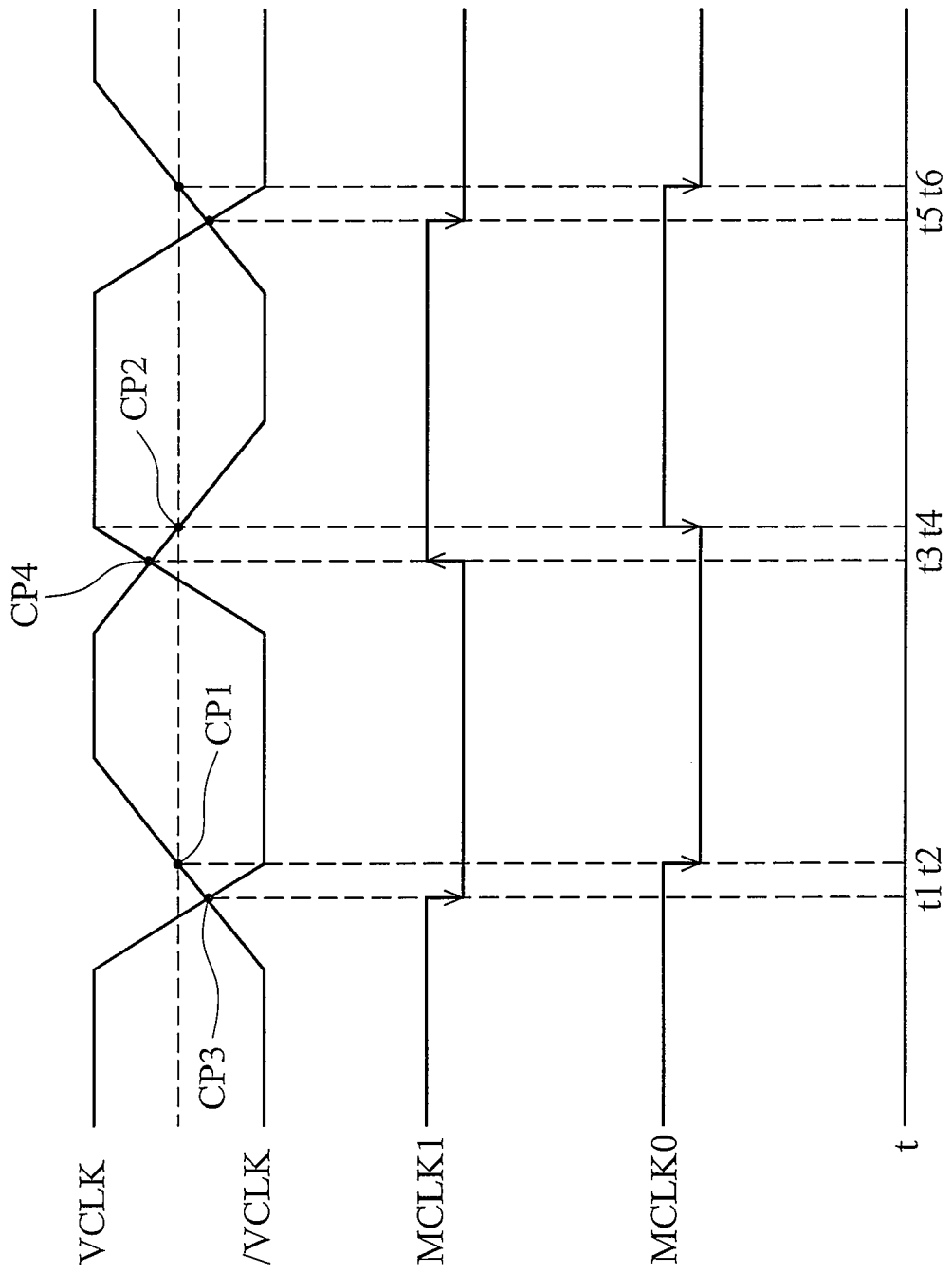
FIG. 1A is diagram showing advanced cross of clocks VCLK and /VCLK caused by inconsistency in the complementary clocks VCLK and /VCLK.

When the clocks VCLK and /VCLK are low and high and the duty cycle of the clock /VCLK is smaller than that of the clock VCLK, the voltage on the node NDA is decreased. Namely, the detection unit 14 detects that the clocks VCLK and /VCLK has advanced to cross at time t3 rather than the predetermined cross time t4, as shown in FIG. 1A.

When the voltage on the node NDA (i.e., the detection result SDR) is lower than the reference voltage REF, the bias voltages bias-n and bias-p generated by the bias generator 40 are both increased such that pulling high capability of the transistor P7 is decreased. Thus, the phase adjustment unit 50 generates the rising edge of the main clock MCLK with a slower speed when the level of the clock VCLK exceeds that of the clock /VCLK. For example, the rising edge generated at time t3 is delayed to be generated at the predetermined time t4.

Case 2: Delaying the Falling Edge

When the clocks VCLK and /VCLK are high and low and the duty cycle of the clock /VCLK is smaller than that of the clock VCLK, the voltage on the node NDA is decreased. Namely, the detection unit 12 detects that the clocks VCLK and /VCLK has advanced to cross at time t1 rather than the predetermined cross time t2, as shown in FIG. 1A.

When the voltage on the node NDA (i.e., the detection result SDR) is lower than the reference voltage REF, the bias voltages bias-n and bias-p generated by the bias generator 40 are both increased such that pulling high capability of the transistor P7 is decreased. Thus, the phase adjustment unit 50 generates the falling edge of the main clock MCLK with a slower speed when the level of the clock VCLK is lower than that of the clock /VCLK. For example, the falling edge generated at time t1 is delayed to be generated at the predetermined time t2.

Case 3: Advancing the Rising Edge

Figure 1B:
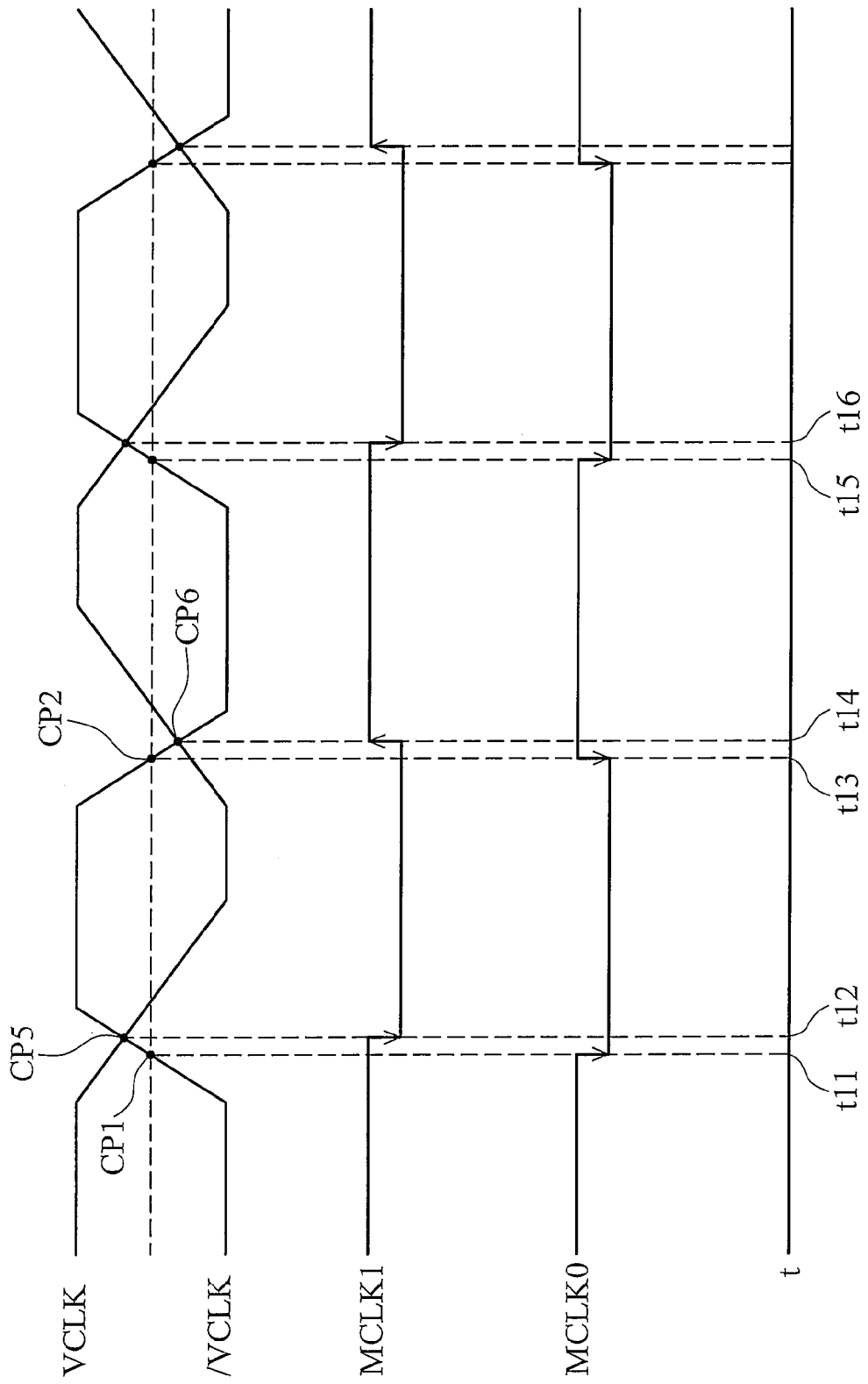
FIG. 1B is diagram showing delayed cross of clocks VCLK and /VCLK caused by inconsistency in the complementary clocks VCLK and /VCLK.

When the clocks VCLK and /VCLK are low and high and the duty cycle of the clock /VCLK is larger than that of the clock VCLK, the voltage on the node NDA is increased. Namely, the detection unit 14 detects that the clocks VCLK and /VCLK is delayed to cross at time t14 rather than the predetermined cross time t13, as shown in FIG. 1B.

When the voltage on the node NDA (i.e., the detection result SDR) exceeds the reference voltage REF, the bias voltages bias-n and bias-p generated by the bias generator 40 are both decreased such that pulling high capability of the transistor P7 is increased. Thus, the phase adjustment unit 50 generates the rising edge of the main clock MCLK with a faster speed when the level of the clock VCLK is lower than that of the clock /VCLK. For example, the rising edge generated at time t14 is advance to be generated at the predetermined time t13.

Case 4: Advancing the Falling Edge

When the clocks VCLK and /VCLK are high and low and the duty cycle of the clock /VCLK is larger than that of the clock VCLK, the voltage on the node NDA is increased. Namely, the detection unit 14 detects that the clocks VCLK and /VCLK is delayed to cross at time t14 rather than the predetermined cross time t13, as shown in FIG. 1B.

When the voltage on the node NDA (i.e., the detection result SDR) exceeds the reference voltage REF, the bias voltages bias-n and bias-p generated by the bias generator 40 are both increased such that pulling high capability of the transistor N87 is increased. Thus, the phase adjustment unit 50 generates the falling edge of the main clock MCLK with a faster speed when the level of the clock VCLK is lower than that of the clock /VCLK. For example, the falling edge generated at time t12 is advance to be generated at the predetermined time t11.

The following table 1 shows the relationship between operations of the phase adjustment unit 50 and the clocks VCLK and /VCLK and the bias voltages bias-n and bias-p.

TABLE 1

| | | |
|---|---|---|
| Bias voltages bias-p and bias-n are decreased | VCLK is high/ VCLK is low | Delaying rising edge |
| | VCLK is low/ VCLK is high | Advancing falling edge |
| Bias voltages bias-p and bias-n are increased | VCLK is high/ VCLK is low | Advancing rising edge |
| | VCLK is low/ VCLK is high | Delay falling edge |

Thus, cross point offset caused by inconsistency in duty cycles between the clocks VCLK and /VCLK can be calibrated automatically to prevent from affecting margin of the clocks in the internal circuit. In some embodiment, one of the detection units 12 and 14 in the offset detector 30 can be omitted.

Figure 6:
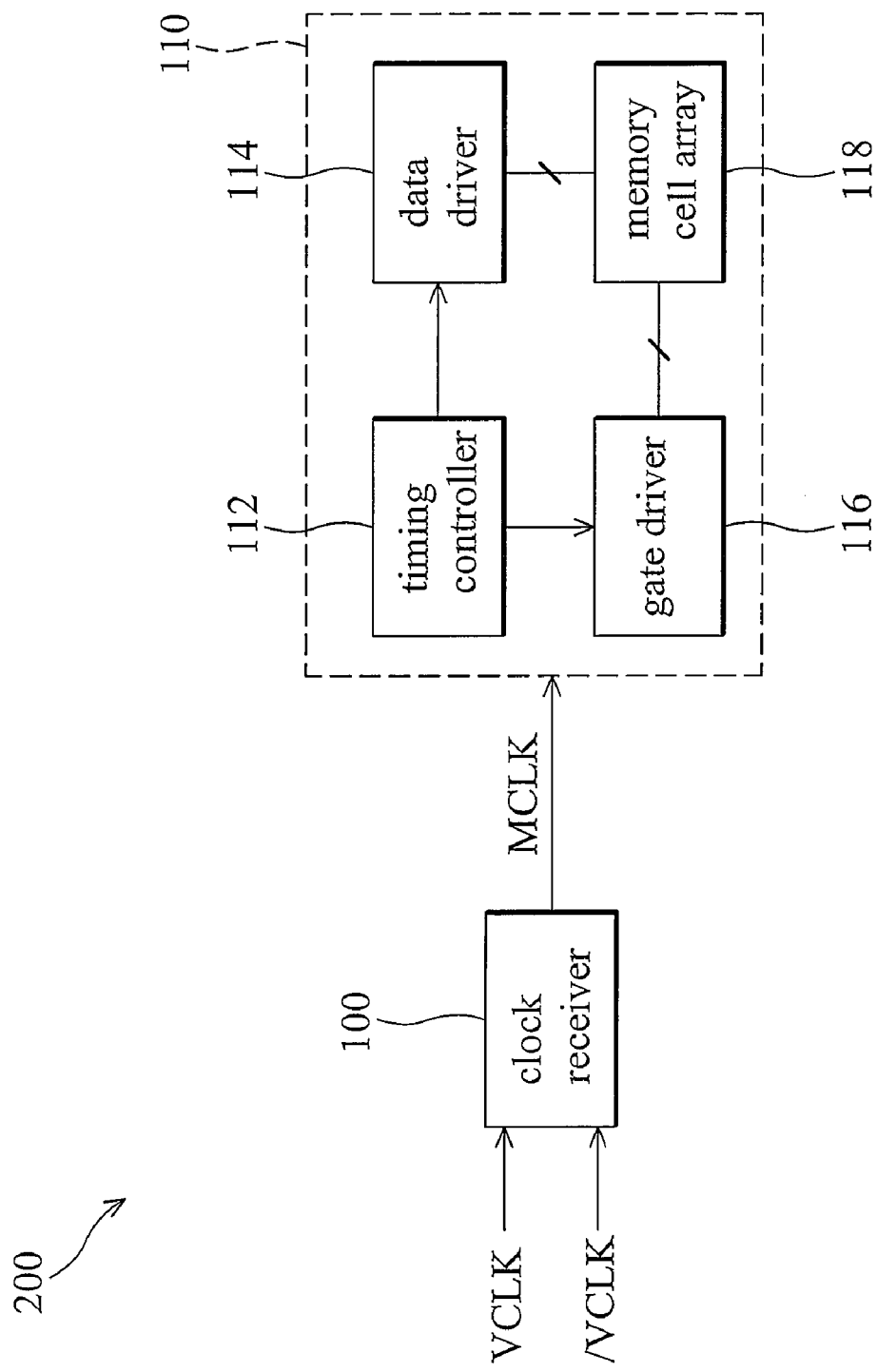
FIG. 6 shows an embodiment of a semiconductor memory module according to the invention.

FIG. 6 shows an embodiment of a semiconductor memory module according to the invention. As shown, the semiconductor memory module 200 comprises the clock receiver 100 and a core logic unit 110. For example, the core logic unit 110 can be a dynamic random access memory but is not limited thereto. In the embodiment, the clock receiver 100 receives the pair of complementary clocks VCLK and /VCLK to generate a main clock MCLK to the core logic unit 110, and the core logic unit 110 at least comprises a timing controller 112, a data driver 114, a gate driver 116 and a memory cell array 118. For example, the timing controller 112 outputs corresponding clocks and data to the data driver 114 and the gate driver 116. The data driver 114 and the gate driver 116 access the date stored in the memory cell array 118.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A clock receiver comprising:
    a receiving unit receiving a pair of complementary clocks to generate a first clock; and
    a calibration unit detecting a shift of a cross point of the pair of complementary clocks so as to adjust toggling of the first clock accordingly, wherein the calibration unit comprises:
        an offset detector detecting whether a cross point of the complementary clocks has shifted and generating a detected result;
        a bias generator generating a set of bias voltages according the detected results; and
        a phase adjustment unit adjusting the toggling of the first clock according to the set of the bias voltages, wherein the phase adjustment unit comprises a first transistor of a first conductive type and a second transistor of a second conductive type, and adjusts turning on and off of the first and second transistors according to the set of the bias voltages.

2. The clock receiver as claimed in claim 1, wherein the phase adjustment unit selectively delays or advances a rising edge or a falling edge of the first clock according to the set of the bias voltages.

3. A semiconductor memory module comprising:
    a clock receiver receiving a pair of complementary clocks and generating a main clock, and the clock receiver comprising:
        a receiving unit receiving the complementary clocks and generating a first clock; and
        a calibration unit generating a detect result by detecting a shift of a cross point of the complementary clocks, and adjusting toggling of the first clock according to the detect result to output a main clock; and
    a core logic unit outputting corresponding control clocks and data according to the main clock, wherein the calibration unit comprises:
        an offset detector detecting whether a cross point of the complementary clocks has shifted and generating the detected result;
        a bias generator generating a set of bias voltages according the detected results; and
        a phase adjustment unit adjusting the toggling of the first clock according to the set of the bias voltages, wherein the phase adjustment unit comprises a first transistor of a first conductive type and a second transistor of a second conductive type, and adjusts turning on and off of the first and second transistors according to the set of the bias voltages.

4. The semiconductor memory module as claimed in claim 3, wherein the phase adjustment unit selectively delays or advances a rising edge or a falling edge of the first clock according to the set of the bias voltages.

5. The semiconductor memory module as claimed in claim 3, wherein the semiconductor memory module is a semiconductor memory device.

6. The semiconductor memory module as claimed in claim 5, wherein the semiconductor memory device is a dynamic random access memory (DRAM).

7. A calibration method, comprising:
    generating a first clock according to a pair of complementary clocks;
    detecting whether a cross point of the complementary clocks has shifted to generate a detected result;
    generating a set of bias voltages according to the detected result; and
    adjusting toggling of the first clock according to the bias voltages, wherein the toggling of the first clock is adjusted by adjusting turning on and off of a first transistor of a first conductive type and a second transistor of a second conductive type.

8. The calibration method as claimed in claim 7, wherein a rising edge or a falling edge of the first clock is selectively delayed or advanced according to the set of the bias voltages.

* * * * *